United States Patent Office 2,878,178
Patented Mar. 17, 1959

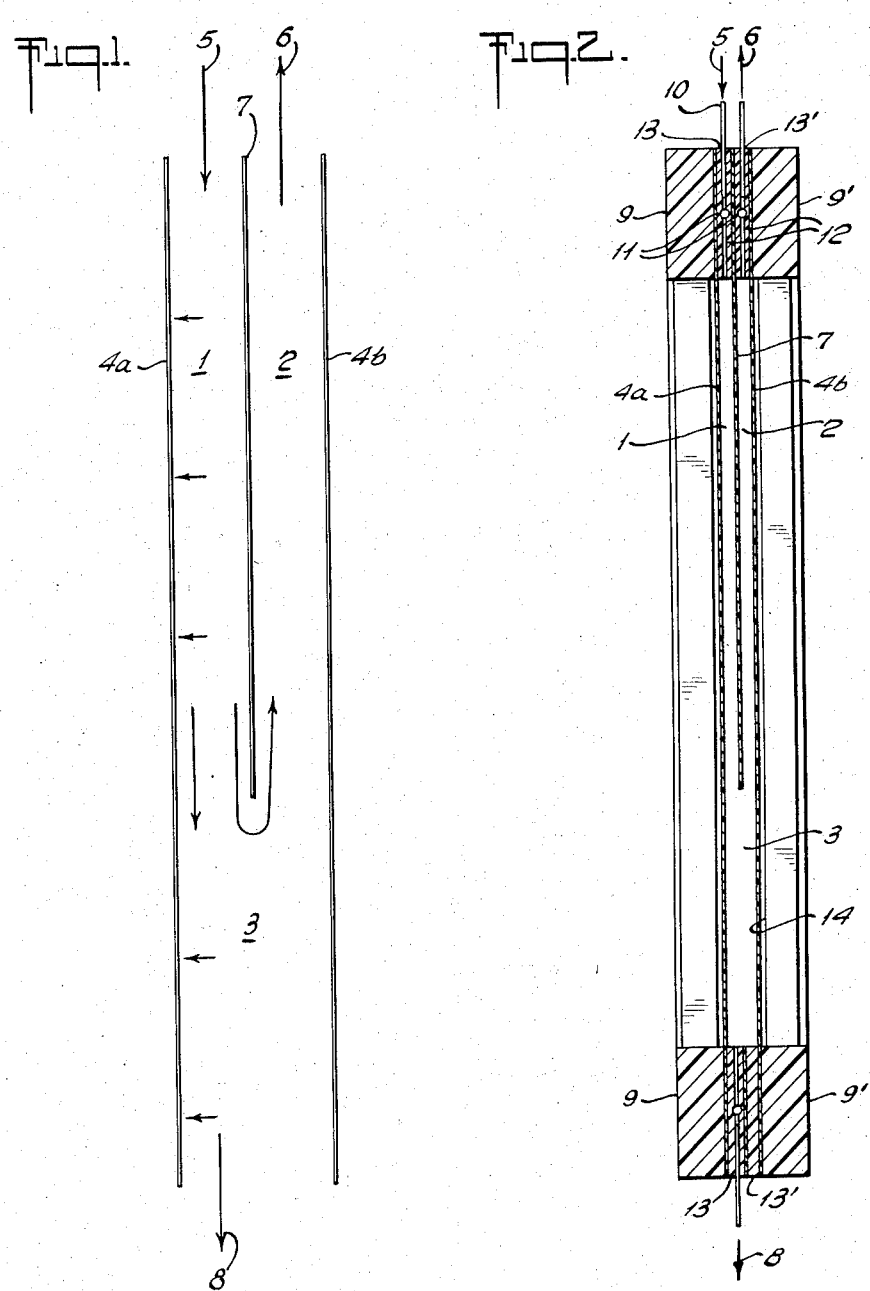

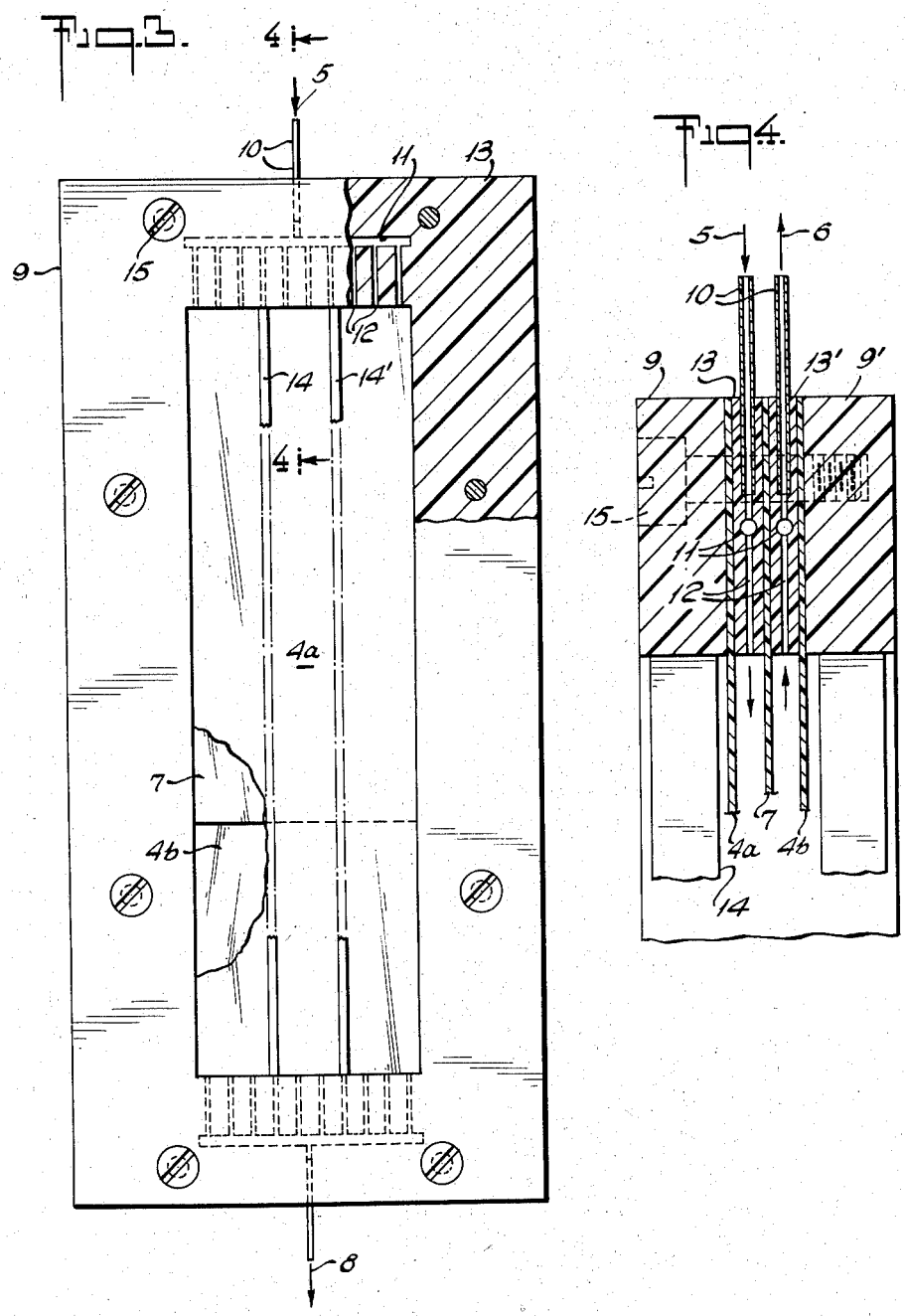

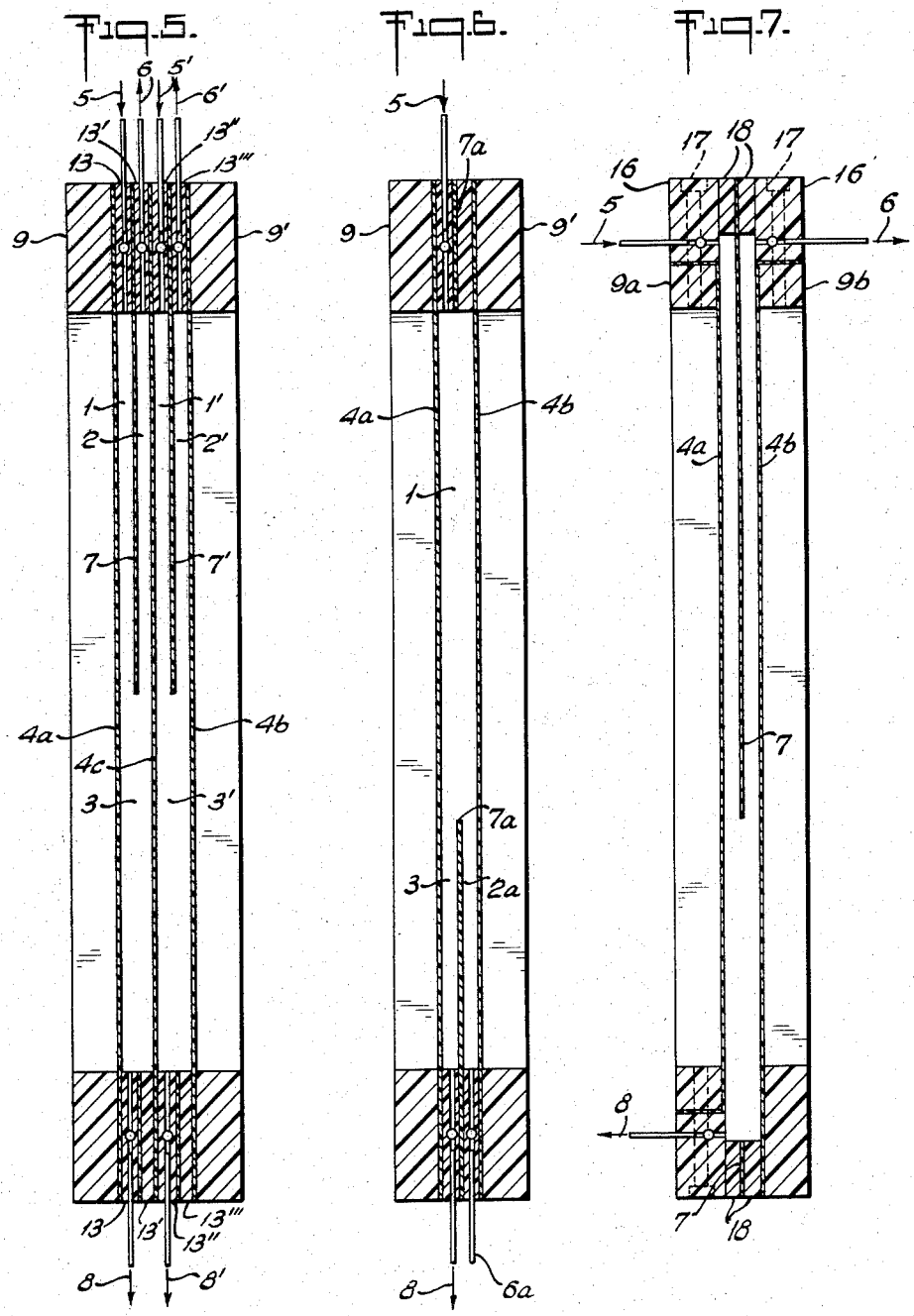

2,878,178

CONTINUOUS FREE-BOUNDARY FLOW ELECTROPHORESIS

Milan Bier, New York, N. Y.

Application April 15, 1955, Serial No. 501,635

5 Claims. (Cl. 204—180)

The invention relates to a process of electrophoretic separation or concentration or purification of colloidal dispersions, and to an apparatus suitable for carrying out said process.

A principal object of the invention is to provide an electrophoretic process which makes it possible to purify colloidal dispersions and to separate and concentrate the colloids contained in such dispersions in a continuous manner.

Another object of the invention is to provide a simple apparatus suitable for the continuous electrophoretic purification, concentration and separation of the components of colloidal dispersions.

Other objects and advantages will be apparent from a consideration of the specification and claims.

In accordance with the invention, a liquid column containing at least one colloid is passed continuously in substantially vertical direction between semi-permeable membranes through a horizontal direct current electric field, the polarity of which, and the pH and salt concentration of the liquid are so adjusted with respect to the iso-electric points of the colloidal components that the component to be concentrated or separated migrates in said field toward the first of said membranes, whereas the impurities or other components are not subjected to said migration or migrate toward the other membrane. In this way, the component to be concentrated or separated forms a layer of increased concentration along said first membrane and moves according to its specific gravity either upwardly or downwardly toward the top or bottom of said membrane, where it is continuously recovered in concentrated and purified state; at the same time, the remainder of the liquid column is continuously withdrawn separately from said concentrated colloid layer. The critical feature of my novel continuous process consists in guiding the concentrated colloid layer and the remainder of the column in such a way that the two portions of the column, once separated under the influence of the electric field, are substantially prevented from intermingling again and are kept separate until the component to be concentrated or separated is withdrawn.

The invention will be better understood with reference to the accompanying drawings showing embodiments of suitable apparatus.

In the drawings:

Fig. 1 is a diagram illustrating the migration of a colloid system treated according to the invention;

Fig. 2 is a cross-section of an apparatus suitable for carrying out the method illustrated in Fig. 1;

Fig. 3 shows a front view and partial sectional view of the cell of Fig. 2;

Fig. 4 is an enlarged cross section of the top part of the cell shown in Figs. 2 and 3;

Fig. 5 shows an assembly comprising several electrophoretic cells according to Fig. 2 connected in series.

Figs. 6 and 7 are views similar to Fig. 2, showing other embodiments of the invention.

Referring now first to the diagram of Fig. 1, a solution to be fractionated and/or concentrated is continuously delivered into the compartment 1 of an electrophoretic cell through an inlet 5, and is continuously withdrawn through the outlets 6 and 8, the flow of the liquid being indicated by the long arrows. The two walls of the chamber, designated 4a and 4b, are constituted by semi-permeable dialyzing membranes, such as dialyzing membranes available in commerce under the trade name "Visking." The walls are held in a frame (not shown) in such a way that the cell is sealed and fully isolated from the exterior, except through said membranes 4a and 4b, and the inlet and outlets 5, 6 and 8. The reference numeral 7 designates a thin membrane of similar material as the two membranes 4a and 4b, and is clamped in a position intermediate and parallel to the two membranes 4a and 4b; said membrane 7 extends, however, only partly into the cell, i. e. it does not reach its bottom and divides the upper part of the cell into the compartments 1 and 2.

The whole cell is immersed in an appropriate buffer solution and inserted between two electrodes connected to a source of direct current, so that an electrical field is produced transversally to the presented diagram of the chamber, and across the two membranes 4a and 4b. This electrode system and the buffer containing vessel is not shown, as such arrangement is well known in the art. The buffer can be either circulated or periodically renewed, or if the products of electrolysis of the buffer are not undesirable, it may also be stationary. The pH and salt concentration may be continuously or intermittently controlled and readjusted to the desired values. Under certain conditions, the liquid to be fractionated, and/or concentrated, can act as its own buffer outside of the cell prior to, or after, its introduction therein.

If only a concentration of the colloidal material contained in a solution is desired, the solution is continuously fed through the inlet 5 into the cell. The outside buffer, its pH and salt concentration, and the polarity of the direct current electrostatic field is adjusted in such a way as to cause the colloidal material to migrate towards the membrane 4a, and away from the membrane 7, as indicated by the short arrows in Fig. 1. The rate of admission of the solution is adjusted with respect to the mobility of the colloidal particles in the particular buffer and the intensity of the electrical field, in such a way that substantially all the particles will have migrated the distance from the membrane 7 to the membrane 4a in the time interval that it takes for the liquid to flow through the whole compartment 1. All the liquid introduced through the inlet 5 is forced to flow through the compartment 1, at the bottom of which the flow of liquid separates; part of the liquid is forced upwardly through the compartment 2 and the outlet 6, the rest of the liquid continuing the downwards flow through the compartment 3 and outlet 8, as indicated by the long arrows. The colloidal material, having migrated while in the compartment 1 to the immediate neighborhood of the membrane 4a, will be carried with that portion of liquid flowing through the compartment 3, and will thus be delivered through the outlet 8. The rate of the outflow through the two outlets 6 and 8 can be individually controlled, and thus the desired concentration of the colloidal material can be achieved by appropriately regulating the relative rate of delivery through the two outlets. The outlet 6 will deliver only the suspending medium from which the colloidal particles have been substantially removed.

The concentration of the colloidal material will be further assisted by the fact that through the concentration of the material in the immediate neighborhood of the membrane 4a, said part of the solution containing this increased concentration of the colloidal material will have a higher specific density than the rest of the solution, and a laminar downward flow, due to gravity alone, and superimposed to the forced downward flow of liquid, will be established. It is obvious that the rate of concentration will be directly proportional to the electrophoretic mobility of the colloidal particles. In order therefore to augment the quantity of liquid which can be processed at a given time, the pH of the buffer and its salt concentration will be chosen so as to convey the greatest mobility to the colloidal particles, within the limits of the stability of the colloidal system.

If separation of two colloidal components is desired, the two components being characterized by different isoelectric points, such separation can be accomplished by a procedure essentially similar to that just described for the concentration of colloidal solutions. The pH of the buffer is adjusted in such a way that the two colloidal components will migrate in opposite directions when exposed to a direct current electrical field. When one of the components possesses a zero mobility (a neutral colloid or a polyelectrolyte at its isoelectric point), the same procedure can be applied. The polarity of the electrostatic field will be adjusted in such a way that one of the components will migrate in the direction of the membrane $4a$. The other component will therefore either migrate in the direction of the membrane 7, or remain uniformly distributed throughout the liquid, if it happens to possess no net charge. The component migrating towards the membrane $4a$ will be eliminated through the outlet 8, as outlined above, and will be present only in trace quantities in the liquid delivered through the outlet 6. The other component will be either delivered in essentially the same concentration through the two outlets 6 and 8, or will be delivered in higher concentration through 6 than through 8, due to its migration toward the membrane 7. It is thus obvious that if one of the components is desired in high state of purity, the pH of the buffer and polarity of the electrical field has to be adjusted so as to cause said component to migrate towards the membrane 7, whereupon it will be delivered through the outlet 6 in a high state of electrophoretic purity, i. e. essentially free of the other component. As the same component will be delivered also throughout the outlet 8, the yield of the fractionation will depend on the relative rate of flow of liquid through the two outlets, 6 and 8, which can be varied within wide limits. If, to the contrary, high electrophoretic purity is not of prime importance and a total recovery of one of the components is desired, it is this component which will be made to migrate towards the membrane $4a$. This component will thus be fully recovered through the outlet 8, admixed with a certain amount of the other component. Again, the purity of the fraction obtained through the outlet 8 will depend on the ratio of volumes delivered through the outlets 6 and 8.

In certain cases of two-component mixtures, it might not be desirable or possible to operate at a pH intermediate between the isoelectric points of the two components. A partial separation can still be realized if both components are made to migrate towards the membrane $4a$ and the liquid flow is adjusted to the maximum rate concordant with a complete elimination of the faster of the two components through the outlet 8. The slower component will then also be concentrated in the outflow through the opening 8, but only to the extent of the ratio of the relative mobilities of the two components.

With colloidal solutions containing more than two electrophoretically distinct components, the fractionation can be accomplished according to the principles outlined above. In every experimental run only two fractions can be obtained and the composition of each fraction will depend on the relative values of the isoelectric points of each component with respect to the pH of the buffer employed.

A cell embodying the principles illustrated in Fig. 1 is shown by way of example in Figs. 2–4, wherein the membranes $4a$ and $4b$ are supported between the frames 9, 9'. The inlet 5 consists preferably of a stainless steel duct 10 and channel 11, which opens through a number of minute apertures 12 into the cell. The outlets 6 and 8 are similarly constructed. Gaskets 13, 13' hold the membrane 7 and seal the cell, and contain the inlet 5 and outlets 6 and 8 (Fig. 2).

In order to assure the proper alignment of the parallel parts of the cell (frames 9 and 9', gaskets 13 and 13') a spacer $7b$ of the same thickness as the membrane 7, may be inserted between the two gaskets 13 and 13' in continuation of the membrane 7. This can be simply accomplished by providing a membrane 7 of the same outer size as the gaskets 13, and cutting out an opening defining the dimension of the compartment 3.

The frames 9, 9' are made of a suitable material and are clamped together by means of screw bolts 15. Strips 14 are provided to prevent bulging of the membranes, as shown in Fig. 3.

In Fig. 4 an enlarged view of the cross section of the top of the cell is presented, to show in greater detail the alignment of the frames 9, 9', gaskets 13, 13', membranes $4a$, $4b$, and 7, the screw bolt 15 and the inlet 5 and outlet 6.

Several cells may be connected within a single frame, as diagrammatically indicated for a two cell assembly in Fig. 5. In this arrangement, a cell formed by the outer membranes $4a$ and $4b$ is divided by an inner membrane $4c$ into two adjoining chambers, which form individual cells and are each divided by membranes 7, 7' into compartments 1, 2, and 3, and 1', 2', 3', respectively, corresponding to the compartments shown in Fig. 1. The membranes are held by gaskets 13, 13', 13'', and 13''', which serve also for receiving the inlets 5, 5', and outlets 6, 6', 8, 8', for the colloidal dispersions and the obtained concentrates, respectively.

As the amount of electric current required to produce the electric field across the membranes is essentially independent of the number of membranes and cells, such an assembly consisting of two or more associated cells presents the advantage that with the same expenditure of electric energy either a greater quantity of liquid can be processed in the same time, if the cell inlets are connected in parallel, or that the fractions coming from the outlet 6 or 8 of the first cell can be immediately further fractionated by connecting said first cell with the inlet 5' of the next cell.

Instead of arranging a semi-permeable partition in the upper part of the cell and guiding part of the liquid column around said partition with reversal of flow, it is possible to withdraw both portions of the liquid from the bottom of the cell after the vertical stratification in the flowing column has been established by the electric field. In this case, which is illustrated by Fig. 6, the semi-permeable membrane 7 can be omitted and a partition $7a$ is provided between the outlets 8 and $6a$ to prevent intermingling of the separated layers by convection at the points of withdrawal. The partition $7a$ need not be semipermeable, as it can be located in a zone outside the electric field where the migration of the colloid particles toward the walls of the cell is substantially completed. The possibility of using a partition which is stiffer than semi-permeable membranes has the advantage of presenting a greater resistance to the impact of the flowing liquid within the very narrow cell and to decrease fluctuations of the size of the compartments. A similar result as with the cell of Fig. 6 will be obtained with a cell having the form of an inverted Y, where the liquid is fed into the stem of the Y, which is traversed by the electric field, and the two vertical layers are separately withdrawn from the arms of the Y. In such an arrangement, no partitions are necessary.

Instead of arranging the inlet and outlet tubes in the gaskets 13, 13', they may be provided in cross-strips 16, which are fastened to the frames 9a, 9b, by means of screw bolts 17, and serve also to secure the membranes 4a, 4b, to the supporting frames 9a, 9b, as shown in Fig. 7; spacers 18 of suitable material, like rubber or plastics, hold the membrane 7.

So far, it has been assumed that the colloids to be separated or concentrated have a specific gravity greater than that of the dispersing medium, as is the case for most colloidal materials. Rubber latex, and certain lipoproteins may be recited as examples of colloidal suspensions where the colloidal material has a density smaller than that of the dispersing medium. In such a case, the vertical layer of increased colloidal concentration formed by the electrophoretic migration will tend to flow upwardly rather than downwardly. There is then a distinct advantage to operate the cells in an inverted position, so as to assist the separation of the obtained layer by the direction of flow of the liquid. Applied to the cell of Fig. 2, for instance, it would only be necessary to turn the cell upside down and pass the colloidal dispersion therethrough as described above.

For a better understanding of the continuous electrophoretic separation according to the invention, it may be helpful to attempt an approximate theoretical analysis of the factors controlling the rate of concentration or fractionation. However, it is not intended to limit the scope of the invention in any way by the following theoretical considerations.

In order to obtain a complete elimination of the suspended colloidal material through the outlet 8, the rate of inflow of the solution into the cell through the inlet 5 must be such that all colloidal particles have time to reach the membrane 4a, due to the electrophoretic transport, within the same time which it takes the liquid in which they are carried, to reach the lower end of the membrane 7. The volume of the compartment 1 will be given by the product of the width $w$ of the fractionation cell, the distance $d$ separating the membrane 4a from the curtain membrane 7, and the length $l$ of the same. The rate of electrophoretic mobility is given by the well known equation $$\frac{d'}{t} = \mu E$$

in which $d'$ represents the distance travelled by the particle in the time $t$, under the influence of the electric field $E$, the particles possessing an electrophoretic mobility $\mu$. The distance $d'$ which the particles have to travel in the cell is equal to the distance $d$ between the two membranes. Therefore, the time necessary for the particles to travel this distance $d$ is the same as the time required for the flow of liquid from opening 5 to the free end of membrane 7. The equation defining said time is $$t = \frac{d}{\mu E} = \frac{dlw}{v}$$

wherein the symbol $v$ stands for the rate of flow of liquid in ml. per sec. Through rearrangement, we obtain:

$$v = lw\mu E$$

From this equation it appears that the maximum rate of flow concordant with a complete separation of the colloidal particles through outlet 8 is independent of the distance separating the two membranes and increases with the other dimensions of the fractionation cell, as well as the mobility of the particles and the electrical field applied. It is advantageous to keep the distance $d$ small as it helps to maintain the laminar flow along the membrane 4a, and also it facilitates the rapid dissipation to the buffer of the heat generated by the passing of the current, thus avoiding convection currents.

A further analysis of the above equation is possible. The electrical field $E$, expressed in volts/cm. is usually not measured directly but is derived from the conductivity $k$ of the buffer and the intensity $I$ of the current applied, through the equation $E = I/kA'$ wherein the cross area of the electrophoretic vessel $A' = wl'$, where $l'$ is the length of the whole electrophoretic cell. We obtain therefore $$v = lw\mu E = \frac{lw\mu I}{kl'w} = \frac{\mu I}{k} \times \frac{l}{l'}$$

According to the latter equation, the overall dimensions of the cell are without effect on the theoretical maximum rate of separation of colloidal material but the rate depends on the mobility $\mu$, an intrinsic property of the colloidal particles themselves at a given pH and salt concentration, the ratio of current applied over conductivity of the solution and the ratio of the length of the membrane 7 over the total length of the cell. It is obvious also that, all other factors being equal, it is advantageous to work at very low ionic strength, as the conductivity of such solutions is very low, and higher ratios of $I/k$ can be realized. Having once decided upon a proper pH and salt concentration, the rate of separation will depend only on the intensity of the current applied, while the dimensions of the cell will have to be chosen with regard to minimizing the heat effect of the current. An approximation to the rates of fractionation obtainable with the apparatus can be obtained by substituting the proper order of magnitudes in the last equation. Thus, the mobility $\mu$ is of the order of magnitude of at least $10^{-5}$, while the conductivity of a salt solution of 0.1 ionic strength is about $5 \times 10^{-3}$. The ratio $1/1'$ is close to 1. The rate obtainable at $\mu = 2 \times 10^{-5}$ for example, using a current intensity of 1 ampere is about $4 \times 10^{-3}$ ml./sec. or about 0.24 ml./min. Using a solution of only 0.02 ionic strength, flow rates of about 2 ml/min. are readily obtained.

My novel method and apparatus can be used for an infinite number of industrial and scientific applications. For instance, I may mention the fractionation or concentration of amino acids and proteins which are present in blood plasma or serum, milk products, tissue, extracts of animal or vegetable origin, vaccines, sera, enzyme and hormone extracts and the like. Other fields of application are natural and synthetic latices, waste liquids, sewage, sulfite liquors. Another application is in the decontamination of colloidal radioactive dispersions, whereby the colloidal carrier of the radioactive material may be already present in the starting solution or may be added to absorb the non-colloidal radioactive material.

The following examples are given to aid in understanding the invention, and it is to be understood that the invention is not limited to the apparatus or procedural details disclosed in the examples.

All the tests were made in a cell of the type illustrated in Fig. 2.

EXAMPLE 1

*Concentration of hemoglobin*

Starting solution: Bovine hemoglobin (isoelectric point about pH 6.8) 0.3% in 0.05 M barbiturate buffer, pH 8.6.

Cell: Width 5 cm., length 25 cm., length of membrane 7 = 15 cm., distance between the two outer membranes 4a and 4b = 0.3 cm.
   E, nominal: 4 volt/cm.
   Inflow: 1 ml./min.
   Outflow:
      Outlet 8—0.2 ml./min., concentration 1.4%
      Outlet 6—0.8 ml./min., concentration 0.015%
   Separation coefficient: 1.4/0.015, or approx. 100

The hemoglobin concentration was determined by the conventional colorimetric method.

EXAMPLE 2

*Separation of two colloidal components*

A solution was prepared by mixing bovine hemoglobin (H.) and crystalline bovine serum albumin (S. A.). The concentration of the components as determined by colorimetric measurements in the visible and ultraviolet region was as follows:

Initial solution:
- Bovine hemoglobin (isoelectric point about pH 6.8) 0.3%
- Serum albumin (isoelectric point about pH 5) 0.3%, dissolved in an 0.1 M acetate buffer, pH 6

Flow rates: Input—0.6 ml./min., output outlet 8: 0.2 ml./min.; output outlet 6: 0.4 ml./min.

Results:
At $E=1$ v./cm.—
- Outlet 8: H. 0.3%, S. A. 0.3%
- Outlet 6: H. 0.3%, S. A. 0.3%

At $E=1.5$ v./cm.—
- Outlet 8: H. 0.4%, S. A. 0.3%
- Outlet 6: H. 0.25%, S. A. 0.3%

At $E=3$ v./cm.—
- Outlet 8: H. 0.6%, S. A. 0.28%
- Outlet 6: H. 0.15%, S. A. 0.3%

At $E=5$ v./cm.—
- Outlet 8: H. 0.85%, S. A. 0.25%
- Outlet 6: H. 0.03%, S. A. 0.32%

Yield of the fractionation at $E=5$ v./cm.
- Separation coefficient of hemoglobin—0.85/0.03, or approx. 30
- Purification of serum albumin—0.32/0.03 : 0.3/0.3, or approx. 10
- Purification of hemoglobin—0.85/0.25 : 0.3/0.3, or approx. 3.5
- Yield of hemoglobin through outlet 8—100%
- Yield of serum albumin through outlet 6—70%

The separation was carried out by adjusting the electrical field in such a way that the hemoglobin was migrating towards the membrane 4a of the electrophoretic cell. By reversing the current, while keeping all other conditions equal, one obtains:

At $E=5$ v./cm.—
- Outlet 8—Hemoglobin 0.3%, S. A. 0.95%
- Outlet 6—Hemoglobin 0.3%, S. A. 0.03%

EXAMPLE 3

*Separation of γ-globulins*

This example is given to illustrate the continuous fractionation of a multi-component colloidal solution.

Initial solution: Human pooled serum, diluted to ½ and equilibrated by dialysis against phosphate buffer, 0.1 M, pH 6.6. The composition was determined by paper electrophoresis:
- Serum albumin: 2.2%
- α Globulins: 0.5%
- β Globulins: 0.6%
- γ Globulins: 0.7%

Cell: Width 5 cm., length 15 cm., length of intermediate membrane 7=10 cm., distance between the outer membranes 4a and 4b=0.3 cm.

Flowrates:
- Inflow—0.5 ml./min.
- Outflow through each outlet: 0.25 ml.

$E=4$ v./cm.

Result:
Outlet 6—
- γ Globulins 0.7%
- β Globulins 0.05%
- Serum albumin not detectable by paper electrophoresis Outlet 8—
- Serum albumin: 4.3%
- Alpha globulins: 0.9%
- Beta globulins: 1.2%
- Gamma globulins: 0.7%

Purification of gamma globulins: 0.7/0.5 : 0.7/3.3, or approx. 66.

Yield of gamma globulins: 50%.

I claim:

1. A method for the continuous concentration, fractionation or purification of colloidal components from their suspension in an electrophoretic cell enclosed by two semipermeable membranes and traversed by an electric field comprising feeding continuously such suspension into one end of the cell, concentrating a colloidal component of the suspension at one of said membranes under the influence of the electric field, continuously withdrawing said concentrated fraction of the suspension from the other end of the cell, continuing the flow of the remaining suspension through the cell in countercurrent to the incoming suspension towards the feed end of the cell, withdrawing said remaining suspension continuously from the feed end, and preventing intermingling of said counterflowing remaining suspension and incoming suspension by a partition permitting passage of the electric field across the cell.

2. An electrophoretic apparatus comprising two semipermeable membranes arranged in parallel planes defining a separation cell between electrodes in planes parallel to said membranes, a third membrane permitting passage of an electric field across the cell and extending from one end of the cell in a plane parallel to said semipermeable membranes to divide the cell into two separate compartments, said third membrane having an aperture at the other end of the cell extending over the width of the membrane and providing communication between said two compartments, inlet means to feed continuously a colloidal suspension into the closed end of one of said compartments, first outlet means to withdraw continuously part of said suspension from the end of the cell enclosing the communicating compartments, and second outlet means to withdraw continuously the remaining suspension from the closed end of the other compartment, thereby forcing said remaining suspension to flow in countercurrent with the incoming suspension, while the intermingling of the two portions of the suspension is prevented by said third membrane.

3. An electrophoretic cell according to claim 2 wherein the said third membrane is a semipermeable membrane.

4. An electrophoretic cell assembly comprising a plurality of cells as claimed in claim 2 arranged in series by connecting the second outlet means of one cell with the inlet means of the subsequent cell.

5. An electrophoretic cell assembly comprising a plurality of cells as claimed in claim 2 arranged in parallel by connecting in series each (a) the inlet means of all cells, (b) the first outlet means of all cells, and (c) the second outlet means of all cells.

References Cited in the file of this patent

UNITED STATES PATENTS

| 182,083 | Seymour | Sept. 12, 1876 |
| 789,016 | Franks | May 2, 1905 |
| 2,801,962 | Polson | Aug. 6, 1957 |

FOREIGN PATENTS

| 516,092 | Great Britain | Dec. 21, 1939 |
| 642,025 | Great Britain | Aug. 23, 1950 |
| 694,223 | Great Britain | July 15, 1953 |
| 726,186 | Great Britain | Mar. 16, 1955 |